United States Patent [19]

Klaerner et al.

[11] 4,189,55[7]
[45] Feb. 19, 198[0]

[54] MANUFACTURE OF HOMOPOLYMERS AND COPOLYMERS OF α-MONOOLEFINS

[75] Inventors: Peter Klaerner, Battenberg; Klaus Bronstert, Carlsberg; Gerhard Staiger, Bobenheim-Roxheim, all of Fed. Rep. of Germany

[73] Assignee: BASF Aktiengesellschaft, Fed. Rep. of Germany

[21] Appl. No.: 901,195

[22] Filed: Apr. 28, 1978

[30] Foreign Application Priority Data

May 16, 1977 [DE] Fed. Rep. of Germany ....... 2722098

[51] Int. Cl.$^2$ .............................................. C08F 4/64
[52] U.S. Cl. ................. 526/159; 252/431 R; 526/139; 526/141; 526/142; 526/351; 526/903; 526/906; 526/907
[58] Field of Search ................ 526/159, 903, 906, 907

[56] References Cited

U.S. PATENT DOCUMENTS

| | | | |
|---|---|---|---|
| 3,130,004 | 4/1964 | Siggel et al. .................... | 526/907 |
| 3,130,005 | 4/1964 | Siggel et al. .................... | 526/907 |
| 3,701,763 | 10/1972 | Wada et al. .................... | 526/906 |
| 3,850,899 | 11/1974 | Wada et al. .................... | 526/906 |
| 3,926,848 | 12/1975 | Wristers et al. ................ | 526/159 |
| 3,979,372 | 9/1976 | van der Bend et al. ......... | 526/159 |
| 4,048,415 | 9/1977 | Matsuzawa et al. ............. | 526/15[9] |

FOREIGN PATENT DOCUMENTS 1444009 7/1976 United Kingdom .

*Primary Examiner*—Stanford M. Levin
*Attorney, Agent, or Firm*—Keil & Witherspoon

[57] ABSTRACT

A process for the manufacture of homopolymers and copolymers of α-monoolefins by polymerizing the monomer or monomers by means of a Ziegler-Natta catalyst comprising (I) a titanium trichloride component and (II) an aluminum-alkyl component, wherein the titanium trichloride component (I) employed is obtained by (1) in a first stage moistening a suitable conventional catalyst component, consisting entirely or substantially of titanium trichloride, with a hydrocarbon mixture comprising a liquid alkane hydrocarbon and a liquid benzene hydrocarbon and (2) in a second stage drying the catalyst component, moistened with the hydrocarbon mixture, under an inert gas, with constant mechanical mixing, within a certain period, at a temperature which is from 5° to 50° C. above the boiling point of the highest-boiling hydrocarbon present in the hydrocarbon mixture which has been used to moisten the component. Homopolymers and copolymers having particularly advantageous morphological properties can be manufactured by the process of the invention.

17 Claims, No Drawings

MANUFACTURE OF HOMOPOLYMERS AND COPOLYMERS OF α-MONOOLEFINS

The present invention relates to a process for the manufacture of homopolymers and copolymers of α-monoolefins of 2 to 6 carbon atoms by polymerizing the monomer or monomers at from 30° to 200° C. under pressures of from 0.1 to 200 bars by means of a Ziegler-Natta catalyst comprising (I) a titanium trichloride component and (II) an aluminum-alkyl component of the general formula $AlR^3$ or $ClAlR^2$, where R is alkyl of 1 to 8 carbon atoms, the atomic ratio of titanium from catalyst component (I) to aluminum from catalyst component (II) being from 1:1 to 1:100.

Processes of this type have proved successful in industrial practice but still suffer from a number of minor or major shortcomings. For example, the titanium trichloride component (I) does not fully meet certain requirements. For instance, it is impossible, or only possible by relatively involved methods, to obtain titanium trichloride components (I) which can give polymers having optimum morphological properties. This applies not only to the polymerization in liquid media but in particular to gas phase polymerization, i.e. polymerization in the absence of liquid auxiliary media and liquid monomers. For example, there is always a more or less pronounced tendency for the finely divided polymers obtained to have a broad particle size distribution, ie. to comprise particles which vary from being relatively very large (diameter about 2,000 μm) to being relatively very small (diameter about 100 μm); in such materials, it is especially the super-fine constituents (diameter less than 200 μm) which are highly undesirable (due to dust hazard, the hazard of dust explosions, and the increased difficulty of further processing).

It is the object of the present invention to provide a titanium trichloride component (I) which represents a technical advance, especially a titanium trichloride component which makes it possible to obtain polymers with advantageous morphological properties, for example a desirably narrow particle size distribution, whilst substantially suppressing, up to the point of virtually preventing, the formation of super-fine constituents.

We have found that this object is achieved by providing a titanium trichloride component which is obtained by treating a suitable conventional titanium trichloride component in a particular way with a particular hydrocarbon mixture.

Accordingly, the subject of the present invention is a process for the manufacture of homopolymers and copolymers of α-monoolefins of 2 to 6 carbon atoms by polymerizing the monomer or monomers at from 30° to 200° C. under a pressure of from 0.1 to 200 bars by means of a Ziegler-Natta catalyst comprising (I) a titanium trichloride component and (II) an aluminum-alkyl component of the general formula $AlR^3$ or $ClAlR^2$, where R is alkyl of 1 to 8 carbon atoms, in the atomic ratio of titanium from catalyst component (I) to aluminum from catalyst component (II) of from 1:1 to 1:100, wherein the titanium trichloride component (I) employed is obtained by (1) first moistening a suitable conventional catalyst component, consisting entirely or substantially of titanium trichloride, with a hydrocarbon mixture comprising 100 parts by volume of an alkane hydrocarbon from the pentane, hexane and/or heptane series and from 10 to 1,000, preferably from 50 to 150, parts by volume of a benzene hydrocarbon from the series comprising benzene and those alkylbenzenes which under atmospheric pressure boil at from 80° to 270° C., preferably from 80 to 175° C., with the proviso that the weight ratio of catalyst component to hydrocarbon mixture used for moistening is from 1:0.5 to 1:100, preferably from 1:1 to 1:10 and (2) thereafter drying the catalyst component, moistened with the hydrocarbon mixture, under an inert gas with constant mechanical mixing over a period of from 0.5 to 5, preferably from 1 to 3, hours under a pressure of from 0.90 to 1.10, preferably from 0.95 to 1.05, bars, at a temperature which is from 5° to 50° C., preferably from 10° to 30° C., above the boiling point, under atmospheric pressure, of the highest-boiling hydrocarbon present in the hydrocarbon mixture employed for moistening.

The following details may be noted with regard to the process according to the invention:

The polymerization process as such can, allowing for its characterizing features, be carried out in virtually all relevant conventional technological forms, eg. as a batchwise, cyclic or continuous process, which may be a suspension polymerization process, solution polymerization process or dry phase polymerization process. The above technological embodiments, ie. the various technological forms of the polymerization of α-monoolefins by the Ziegler-Natta method, are well known from the literature and from industrial practice, so that further details are superfluous here. However, it should be noted that the novel titanium trichloride component (I), like corresponding conventional catalyst components, can, for example, be combined with the aluminum-alkyl component (II) outside or inside the polymerization vessel; in the latter case this is done by, for example, spatially separate introduction of the components, which can be handled as a suspension (component (I)) or a solution (component (II)). It should also be noted that the novel process is particularly suitable for the manufacture of homopolymers of propylene and of copolymers of propylene with minor amounts of ethylene. It can also be used for the manufacture of ethylene homopolymers, of copolymers of ethylene or propylene with higher α-monoolefins, and for the manufacture of homopolymers of higher α-monoolefins, eg. but-1-ene, 4-methylpent-1-ene and hex-1-ene. The molecular weights of the polymers can be regulated in the conventional manner, especially by means of hydrogen as the regulator.

The following may be noted with regard to the novel titanium chloride component (I) itself:

The starting materials are the relevant conventional catalyst components which consist entirely or substantially of titanium trichloride. These, as is known, belong essentially to four groups: (a) Titanium trichlorides as such and titanium trichloride co-crystals with metal halides, especially aluminum chloride, eg. of the formula $TiCl_3.\frac{1}{3}AlCl_3$, cf. for example, U.S. Pat. Nos. 3,128,252 and 3,814,743.

It has been found that amongst this group, a very fine co-crystallized material of the formula $TiCl_3.\frac{1}{3}AlCl_3$ is particularly suitable for the purpose of the invention. (b) Titanium trichlorides or titanium trichloride co-crystals of the type described under (a), which have been modified with electron donors or with Lewis bases. A particularly great variety of such modified titanium trichloride catalyst components exists, since such components are known to offer a number of advantages. To avoid unnecessary repetition, reference may be made, in this context, by way of examples, to British Patent 851,113, French Pat. No. 1,231,089 and German Laid-Open Applications DOS 2,301,136, 2,400,190, 2,441,541 and 2,519,582.

For the purpose of the invention, particularly suitable materials from these groups are very fine co-crystallized materials of the formula $TiCl_3 \cdot \frac{1}{3}AlCl_3$, modified with the following donors or bases: ethers, eg. diisoamyl ether and diisopentyl ether, esters, eg. isoamyl benzoate and ethyl phenylacetate, phosphines, eg. tributylphosphine, phosphine oxides, eg. tributylphosphine oxide, and acid amides, eg. hexamethylphosphorotriamide.

In general, it is advantageous to have a molar ratio of co-crystallized material to donor or base of from about 1:12 to 1:2.

(c) Pre-activated titanium trichlorides or titanium trichloride co-crystals of the type described under (a). As is known, these are titanium trichloride catalyst components which, before being brought together with the aluminum-alkyl component (II), are pre-activated with aluminum-alkyl compounds of the same type. Frequently, titanium trichloride obtained by reducing titanium tetrachloride by means of the aluminum-alkyl compound is used as the starting material.

(d) Titanium trichlorides and their co-crystals which are both modified with electron donors or Lewis bases and pre-activated. Such titanium trichloride catalyst components can in a sense be regarded as a combination of those described under (b) and (c). A typical example is to be found in German Laid-Open Application DOS 2,335,047.

The titanium trichloride catalyst components which serve as the starting material and which have been discussed above and are conventional well-known material in this context, are treated with a particular hydrocarbon mixture in a particular manner. The components of the hydrocarbon mixture are:

(A) An alkane hydrocarbon from the pentane, hexane and/or heptane series, eg. n-pentane, 2-methyl-butane, n-hexane, 2-methyl-pentane, 3-methyl-pentane, n-heptane, 2-methylhexane and 3-methyl-hexane.

Amongst these, n-hexane and n-heptane have proved particularly suitable.

The alkane hydrocarbons may be employed as individual chemical compounds or as mixtures of two or more of these.

(B) A benzene hydrocarbon from the series comprising benzene and those alkylbenzenes which under atmospheric pressure have a boiling point (b.p.$_N$) of from 80 to 270, preferably from 80° to 175° C., eg. benzene (b.p.$_N$=80.1° C.), toluene (b.p.$_N$=110.8° C.), o-xylene (b.p.$_N$=144.4° C.), m-xylene (b.p.$_N$=139.2° C.), p-xylene (b.p.$_N$=138.4° C.), ethylbenzene (b.p.$_N$=136° C.) and trimethylbenzene (b.p.$_N$=175° C.).

Amongst these, toluene, the xylenes and ethylbenzene have proved particularly suitable.

The benzene hydrocarbons may be employed as individual chemical compounds or as mixtures of two or more of these, eg. light oil (b.p.$_N$=80°-170° C.).

The moistening of the primary titanium trichloride catalyst component with the hydrocarbon mixture may be carried out in a simple manner, by the conventional method of moistening finely divided solids with liquids. The appropriate methods and equipment are well known and do not require more detailed discussion here.

The drying of the catalyst component which has been moistened with the hydrocarbon mixture also does not exhibit any peculiar features. It is possible to use the processes and equipment conventionally employed for drying finely divided moist solids under an inert gas atmosphere (in the present case preferably nitrogen), without causing agglomeration. For example, the use of rotary evaporators has proved advantageous.

It should be noted that in carrying out the process according to the invention strict exclusion of moisture and oxygen is advisable, as is conventionally the practice when handling titanium trichloride catalyst components.

EXAMPLE 1

Preparation of the titanium trichloride component (I)

150 ml of hexane and 45 ml of titanium tetrachloride are introduced into a 1 liter stirred flask under a nitrogen atmosphere and are brought to about $-2°$ C. Whilst maintaining this temperature by cooling and stirring, 250 ml of a 20 percent strength by weight solution of diethyl-aluminum chloride in hexane are added dropwise in the course of 4 hours, after which the mixture is first brought to 20° C. at a rate of about 0.5° C./min and then to 65° C. at a rate of about 1.5° C./min. The resulting suspension is then stirred at 65° C. for a further hour, after which the suspended matter is filtered off and washed with three times 100 ml of hexane. The solid obtained is then stirred for one hour with a solution of 73 ml of diisoamyl ether in 450 ml of hexane at 35° C., filtered off and washed with three times 100 ml of hexane. The solid obtained is, in its turn, stirred for two hours with a solution of 105 ml of titanium tetrachloride in 150 ml of hexane at 65° C. and then filtered off.

The primary titanium trichloride catalyst component thus obtained is modified, in accordance with the invention, by first moistening it with a hydrocarbon mixture comprising 100 parts by volume of n-hexane and 100 parts by volume of toluene, by washing it with four 50 ml portions of the mixture (the weight ratio of catalyst component to moistening hydrocarbon mixture is then about 1:0.6). In a second step, the moistened catalyst component is dried under nitrogen, with constant mechanical mixing, in a rotary evaporator at 90° C. for one hour under a pressure of 1.01 bars.

Polymerization 5 l of liquid propylene, 15 liters (S.T.P.) of hydrogen (as the molecular weight regulator) and the titanium trichloride catalyst component (I) modified in accordance with the invention, and di-ethyl-aluminum chloride as the catalyst component (II), both in the amounts shown in the Table which follows, are introduced into a 10 liter stirred autoclave.

The polymerization is carried out at 80° C., corresponding to a pressure of 39.5 bars, for a period of 3 hours, after which the reaction is stopped by letting down the pressure and the polymer formed is isolated.

Further details of the polymer are to be found in the Table which follows.

EXAMPLE 2

Preparation of the titanium trichloride component (I)

50 g of a compound of the formula $TiCl_3 \cdot \frac{1}{3}AlCl_3$, having a maximum particle size of 2 mm, are milled with tributylphosphine in the molar ratio of 6:1 in a vibratory mill for 30 hours at 10° C., using steel balls of 25 mm diameter, with a milling acceleration of 50 m.sec$^{-2}$. The resulting milled material is suspended in 150 ml of heptane, 30 ml of diisopentyl ether and 8 ml of titanium tetrachloride are then added and the mixture is stirred for 30 minutes at 70° C. The resulting solid is then isolated on a fritted disc, under inert gas.

The primary titanium trichloride catalyst component obtained is modified in accordance with the invention, as described in Example 1, except that the drying temperature is 110° C. Polymerization This is carried out as described in Example 1; data relating to the polymer are given in the Table which follows.

EXAMPLE 3

Preparation of the titanium trichloride component (I)

50 g of a compound of the formula TiCl$_3$.⅓AlCl$_3$, having a maximum particle size of 1 mm, are milled with isoamyl benzoate in the molar ratio of 6:1 in a vibratory mill for 30 hours at 10° C., using steel balls of 25 mm diameter, with a milling acceleration of 50 m.sec$^{-2}$. The resulting milled material is suspended in 150 ml of heptane, 30 ml of diisopentyl ether and 8 ml of titanium tetrachloride are then added and the mixture is stirred for 30 minutes at 70° C. The resulting solid is then isolated on a fritted disc, under inert gas. As a next step, 150 ml of hexane and the above solid are introduced into a 1 liter stirred flask and brought to about $-2°$ C. Whilst maintaining this temperature by cooling and stirring, 250 ml of a 20 percent strength by weight solution of diethyl-aluminum chloride in hexane are added dropwise in the course of 4 hours, after which the mixture is first brought to 20° C. at a rate of about 0.5° C./min and then to 65° C. at a rate of about 1.5° C./min. At this temperature, the resulting suspension is stirred for 1 hour and the suspended matter is then filtered off.

The primary titanium trichloride catalyst component obtained is modified in accordance with the invention, as described in Example 1, except that the drying temperature is 120° C.

Polymerization

This is carried out as described in Example 1; data relating to the polymer are given in the Table which follows.

COMPARATIVE EXPERIMENTS A, B and C

These are carried out respectively like Example 1, Example 2 and Example 3, in each case with the sole exception that the modification, according to the invention, of the titanium trichloride catalyst component was omitted. The results are also shown in the Table.

C. under a pressure of from 0.1 to 200 bars by means of a Ziegler-Natta catalyst comprising (I) a titanium trichloride component and (II) an aluminum-alkyl component of the general formula AlR$^3$ or ClAlR$^2$, where R is alkyl of 1 to 8 carbon atoms, in the atomic ratio of titanium from catalyst component (I) to aluminum from catalyst component (II) of from 1:1 to 1:100, wherein the titanium trichloride component (I) employed is obtained by (1) first moistening a catalyst component consisting entirely or substantially of titanium trichloride with a hydrocarbon mixture comprising 100 parts by volume of one or more pentanes, hexanes and/or heptanes and from 10 to 1,000 parts by volume of benzene and/or one or more alkylbenzenes which under atmospheric pressure boil at from 80° to 270° C., with the proviso that the weight ratio of catalyst component to hydrocarbon mixture used for moistening is from 1:0.5 to 1:100 and (2) thereafter drying the catalyst component, moistened with the hydrocarbon mixture, under an inert gas with constant mechanical mixing over a period of from 0.5 to 5 hours under a pressure of from 0.90 to 1.10 bars at a temperature which is from 5 to 50° C. above the boiling point, under atmospheric pressure, of the highest-boiling hydrocarbon present in the hydrocarbon mixture employed for moistening.

2. A process as claimed in claim 1, wherein the hydrocarbon mixture used for moistening contains 50 to 150 parts by volume of aromatic hydrocarbon(s) per 100 parts by volume of aliphatic hydrocarbon(s).

3. A process as claimed in claim 1 or 2, wherein the hydrocarbon mixture used for moistening comprises on the one hand n-hexane and/or n-heptane and on the other hand toluene, o-, m- and/or p-xylene and/or ethylbenzene.

4. A process as set forth in claim 1 or 2 wherein the catalyst component moistened is titanium trichloride or a titanium trichloride/aluminum chloride co-crystal, either as such or modified with an electron donor or Lewis base, or pre-activated with an aluminum alkyl, or both so modified and so pre-activated.

5. A process as set forth in claim 3, wherein the catalyst component moistened is titanium trichloride or a titanium trichloride/aluminum chloride co-crystal, either as such, or modified with an electron donor or a Lewis base, or pre-activated with an aluminum alkyl, or both so modified and so pre-activated.

6. A process as set forth in claim 1 or 2, wherein the weight ratio of catalyst to hydrocarbon mixture used for moistening is from 1:1 to 1:10.

7. A process as set forth in claim 3, wherein the weight ratio of catalyst to hydrocarbon mixture used for moistening is from 1:1 to 1:10.

TABLE

| Example | Catalyst component I; mg | component II; mg | Yield g | g of polymer per g of TiCl$_3$ | Particle $\phi$ <200 μm; % | $[\eta]$ dl/g | Tap density; g/l |
|---|---|---|---|---|---|---|---|
| 1 | 300 | 2,722 | 2,760 | 10,450 | 0.3 | 3.8 | 485 |
| A$^{+)}$ | 300 | 2,722 | 2,745 | 10,400 | 3.1 | 3.2 | 500 |
| 2 | 200 | 1,205 | 780 | 5,040 | 1.9 | 1.1 | 480 |
| B$^{+)}$ | 200 | 1,205 | 790 | 5,100 | 17.0 | 1.3 | 475 |
| 3 | 200 | 1,206 | 1,070 | 6,900 | 0.35 | 1.2 | 505 |
| C$^{+)}$ | 200 | 1,206 | 990 | 6,400 | 15.1 | 1.2 | 490 |

$^{(+)}$ = Comparative Experiment

What we claim is:

1. A process for the manufacture of a polymer of one or more α-monoolefins of 2 to 6 carbon atoms by polymerizing the monomer or monomers at from 30° to 200° for moistening is from 1:1 to 1:10.

8. A process as set forth in claim 4, wherein the weight ratio of catalyst to hydrocarbon mixture used for moistening is from 1:1 to 1:10.

9. A process as set forth in claim 5, wherein the weight ratio of catalyst to hydrocarbon mixture used for moistening is from 1:1 to 1:10.

10. A process as set forth in claim 1 or 2, wherein the drying is carried out for from 1 to 3 hours under a pressure of from 0.095 to 1.05 bars at from 10° to 30° C. above the boiling point under atmospheric pressure of the highest-boiling hydrocarbon present in the hydrocarbon mixture employed for moistening.

11. A process as set forth in claim 3, wherein the drying is carried out for from 1 to 3 hours under a pressure of from 0.095 to 1.05 bars at from 10° to 30° C. above the boiling point under atmospheric pressure of the highest-boiling hydrocarbon present in the hydrocarbon mixture employed for moistening.

12. A process as set forth in claim 4, wherein the drying is carried out for from 1 to 3 hours under a pressure of from 0.095 to 1.05 bars at from 10° to 30° C. above the boiling point under atmospheric pressure of the highest-boiling hydrocarbon present in the hydrocarbon mixture employed for moistening.

13. A process as set forth in claim 5, wherein the drying is carried out for from 1 to 3 hours under a pressure of from 0.095 to 1.05 bars at from 10° to 30° C. above the boiling point under atmospheric pressure of the highest-boiling hydrocarbon present in the hydrocarbon mixture employed for moistening.

14. A process as set forth in claim 6, wherein the drying is carried out for from 1 to 3 hours under a pressure of from 0.095 to 1.05 bars at from 10° to 30° C. above the boiling point under atmospheric pressure of the highest-boiling hydrocarbon present in the hydrocarbon mixture employed for moistening.

15. A process as set forth in claim 7, wherein the drying is carried out for from 1 to 3 hours under a pressure of from 0.095 to 1.05 bars at from 10° to 30° C. above the boiling point under atmospheric pressure of the highest-boiling hydrocarbon present in the hydrocarbon mixture employed for moistening.

16. A process as set forth in claim 8, wherein the drying is carried out for from 1 to 3 hours under a pressure of from 0.095 to 1.05 bars at from 10° to 30° C. above the boiling point under atmospheric pressure of the highest-boiling hydrocarbon present in the hydrocarbon mixture employed for moistening.

17. A process as set forth in claim 9, wherein the drying is carried out for from 1 to 3 hours under a pressure of from 0.095 to 1.05 bars at from 10° to 30° C. above the boiling point under atmospheric pressure of the highest-boiling hydrocarbon present in the hydrocarbon mixture employed for moistening.

* * * * *